March 25, 1941.    J. H. ROETHEL    2,236,448
WINDOW GUIDE
Filed Nov. 11, 1937    2 Sheets-Sheet 1
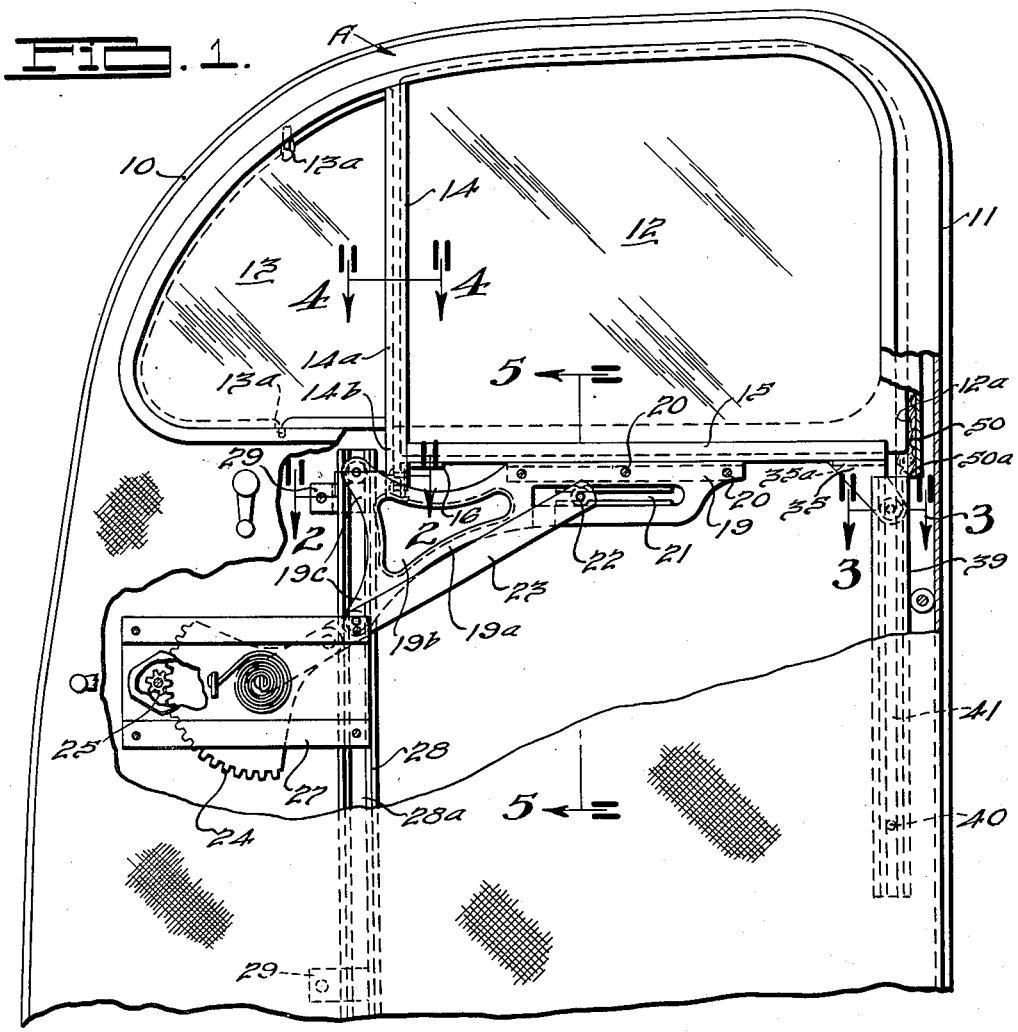
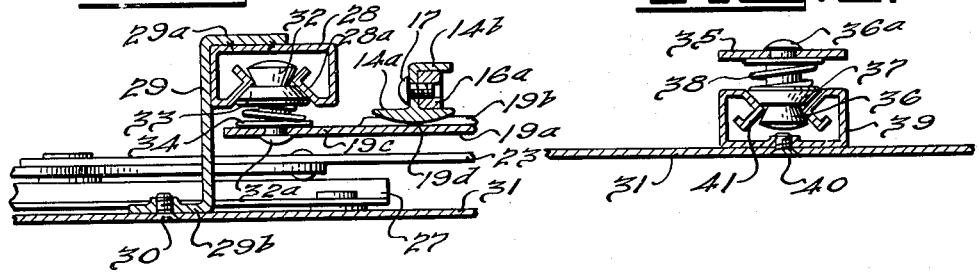
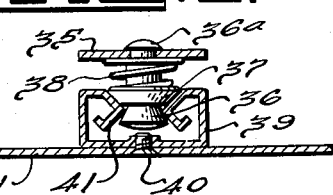
INVENTOR
John H. Roethel.
BY Dike, Calvert & Gray
ATTORNEYS.

March 25, 1941.  J. H. ROETHEL  2,236,448
WINDOW GUIDE
Filed Nov. 11, 1937  2 Sheets-Sheet 2
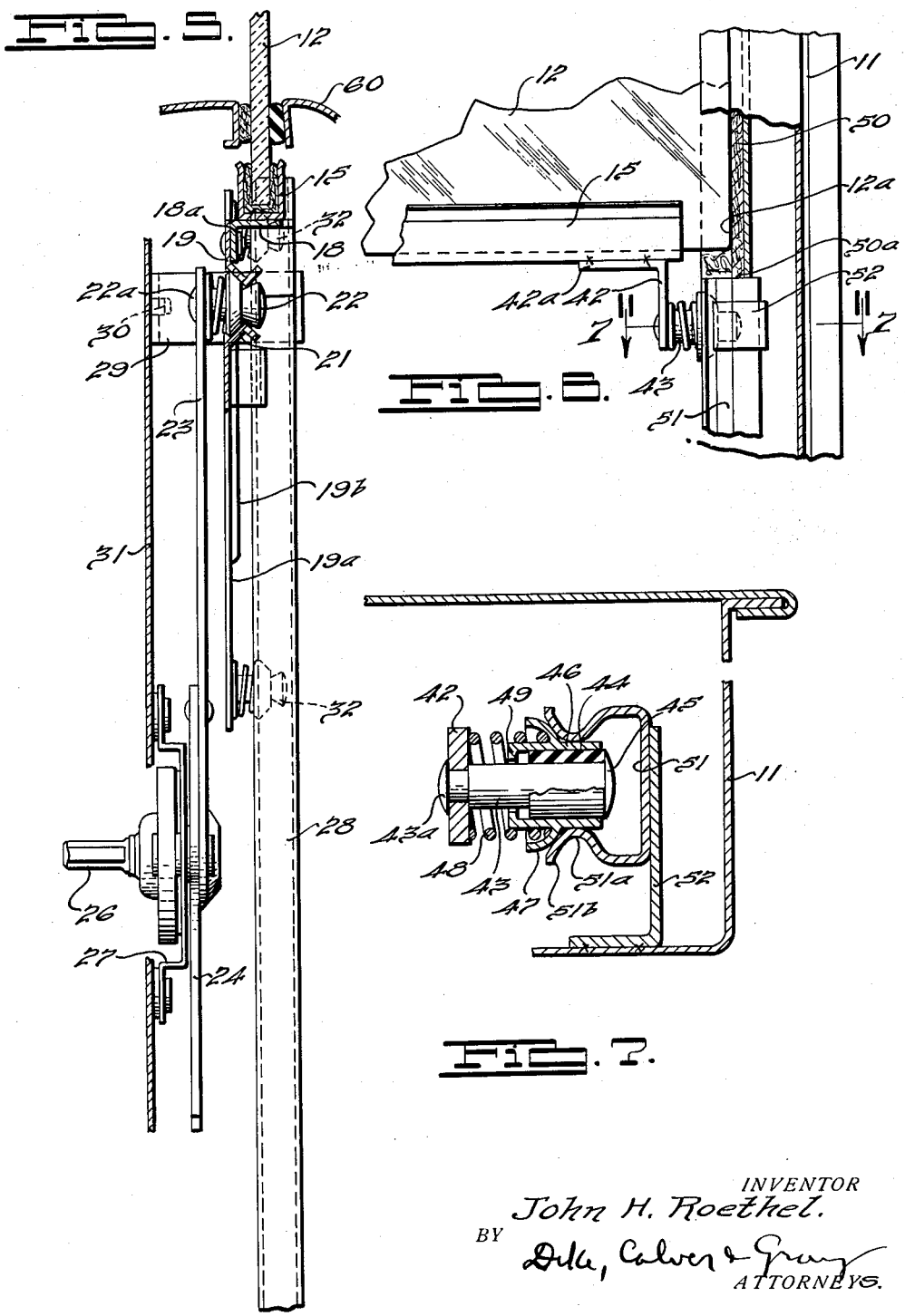
INVENTOR
John H. Roethel.
BY Dike, Calvert & Gray
ATTORNEYS.

Patented Mar. 25, 1941

2,236,448

UNITED STATES PATENT OFFICE 2,236,448

WINDOW GUIDE

John H. Roethel, Detroit, Mich., assignor to Marvel Equipment Corporation, Detroit, Mich., a corporation of Michigan Application November 11, 1937, Serial No. 174,094

14 Claims. (Cl. 296—44.5)

This invention relates to devices for guiding and controlling glass or transparent panels of windows, particularly windows of automobiles, in which the transparent panels or panes are adapted to be raised and lowered, usually through the medium of some suitable regulator mechanism operable from the inside of the automobile body. While the invention is useful in connection with windows of vehicle bodies, such as automobile bodies, wherein the window opening is adapted to be closed by means of a single transparent panel, yet the invention is particularly useful for guiding and controlling the vertically slidable transparent panel of a window which also embodies a pivoted transparent panel cooperable with the sliding panel in its fully raised position to close the window opening.

An object of the invention is to provide improved means for guiding and controlling a vertically slidable panel during its upward and downward movements so that the panel will travel more easily and with less frictional resistance while at the same time it will be held firmly in substantially all positions, thereby minimizing any tendencies of the panel to tilt or to bind in the guides when the panel is raised and lowered and also minimizing vibrational movements of the panel during the travel of the vehicle.

In accordance with conventional automobile body construction the door or other side wall portion of the body is provided with a window opening adapted to be closed or partially so by means of a glass panel which may be lowered into a well below the window opening. In conventional practice the front and rear upright edges of the glass panel are guided within the well by means of channels lined with felt or equivalent material which receive and embrace the edges of the glass. To provide proper guiding of the glass within the window well and also to prevent rattling of the glass when partly or fully lowered it is necessary in practice to provide a relatively snug or tight fit of the edge of the glass in the felt or otherwise lined channel. Owing to allowable tolerances in production and manufacturing variations or inaccuracies it has been difficult to secure uniformly the desired fit of the edges of the glass within the guide channels. If the glass fits too tightly excessive friction is set up, rendering it more difficult to raise and lower the glass and placing undue strain on the regulator mechanism. Since this condition frequently occurs it has been necessary to make the window regulators stronger than need be, thereby increasing their cost. Frictional resistance to the operation of the window glass is also increased whenever the felt lined channels become wet and under such conditions the glass frequently cocks or binds within the guide channels, thereby rendering it more difficult to operate the window regulator.

An object of the invention is to overcome these difficulties and to provide improved means for guiding the window glass into and out of the window well, permitting easy and economical installation of the glass, which means is relatively simple in construction, capable of effecting substantial savings in material and labor costs, more efficient in use, and permitting the use of window regulators of less expensive construction.

A further object is to provide an improved window glass guiding means which eliminates the necessity of directly guiding the upright edge of the glass into and out of the window well, which provides more accurate control of the glass regardless of manufacturing variations, which automatically accommodates or compensates for such variations and which does not appreciably increase the effort required to move the glass up and down regardless of wet or dry conditions.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door embodying the invention.

Fig. 2 is an enlarged sectional view taken substantially through lines 2—2 of Fig. 1 looking in the direction of the arrows.

Fig. 3 is an enlarged sectional view taken substantially through lines 3—3 of Fig. 1 looking in the direction of the arrows.

Fig. 4 is an enlarged sectional view taken substantially through lines 4—4 of Fig. 1 looking in the direction of the arrows.

Fig. 5 is an enlarged vertical section taken substantially through lines 5—5 of Fig. 1 looking in the direction of the arrows.

Fig. 6 is an enlarged fragmentary side view, partly in section, illustrating a modified form of guide.

Fig. 7 is an enlarged horizontal section taken substantially through lines 7—7 of Fig. 6 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated one embodiment of the invention applied, by way of example, to an automobile door, such as the front door thereof. It will be understood, however, that the embodiment herein exemplified may in part or in whole be utilized in connection with the rear door or other window structures of the vehicle. In Fig. 1 there is illustrated an automobile door A which may be a front door including a front sloping pillar 10 and a rear upright pillar 11, the upper portion of the door being provided with a main window opening adapted to be closed by means of a vertically slidable glass or other transparent panel 12 and a swinging glass or other transparent panel 13. In the present instance the panel 13, which is of the so-called wing type, is disposed at the forward part of the window opening and the sliding panel 12 is disposed in rear thereof, these panels being preferably arranged so that when in fully closed positions they cooperate together to close the main window opening. The wing type panel 13 may be pivoted at points 13a so as to swing horizontally about an up and down axis. In the present instance the sliding panel 12 has secured to the upright edge thereof adjacent the panel 13 a metal binding strip or bar 14 in the form of a channel embracing the said edge of the panel 12 and fixed thereto. As shown in Fig. 4, the metal binding strip or bar 14 has a projecting flange 14a which forms an overlap for the adjacent upright edge of the wing 13 when swung into closed position. While in the illustrated embodiment the bar 14 is carried by the panel 12, yet it will be understood that the bar 14 may be a fixed post within the window opening in which the channel therein provides a guide to receive the adjacent upright edge of the panel 12 and be slidingly engaged thereby.

It will be understood that the term "glass" is used herein in a generic sense and is intended to comprehend any panel, preferably a transparent panel, movable up and down to close or open a window opening, or partially so.

Secured to the lower edge of the window glass panel 12 is what is herein termed a glass retainer member or bar or glass retainer channel 15 which preferably comprises a rolled channel member, see Fig. 5, having a liner of felt or other material embracing the lower edge of the glass and secured thereto. The forward end of the glass retainer channel 15 may be secured to a depending leg or extension 14b of the bar 14 through the medium of an angle bracket 16. The horizontal flange of this bracket, see Fig. 1, may be spot welded to the bottom of the channel 15 and the depending flange 16a thereof fitted within the channel of the depending leg or extension 14b, see Fig. 2. The depending flange 16a of the bracket 16 may be detachably secured to the leg 14b through the medium of screws 17.

In the present instance there is secured as by spot welding to the bottom of the glass retainer channel 15 an angle member 18. As seen in Fig. 5 the outwardly directed horizontal flange of this angle is fixed to the base of the channel 15. To the inner depending flange 18a of this angle is detachably secured a plate or member 19. The upper vertical edge of the plate 19 may be detachably secured to the flange 18a by means of a number of screws 20. The member 19 is provided with a longitudinal guide slot 21, the upper and lower edges of which are pressed or rolled to provide V-shaped rail or track portions, see Fig. 5, which receive and embrace the head of a stud 22. The stud 22 has its shank riveted at 22a to the outer end of a swinging window regulator arm 23. The inner end of the arm 23 is fixed to a gear segment 24 having teeth in mesh with a driving pinion 25 adapted to be driven from a handle shaft 26. The gears 24 and 25 are rotatably mounted upon a pressed metal mounting plate 27 secured by screws in the usual manner to an inner pressed metal door or body panel 31, which panel spans and joins the pillars 10 and 11 below the window opening.

The window regulator may be of conventional construction and in the present instance a single arm regulator is shown for the reason that the improved guiding means of the present invention for the sliding panel 12 is such as to permit utilization of a single arm window regulator rather than more expensive double arm regulators. It will be understood, however, that the invention is not limited to the particular regulator herein employed by way of example.

The forward upright edge of the sliding panel 12 is in the present instance guided through the medium of a vertical or upright channel guide 28 disposed within the window well. It will be seen in Figs. 2 and 5 that the vertical channel guide 28 is spaced outwardly from the inner door or body panel 31 and also that this channel guide is arranged out of line and beyond the line of travel of the upright edge 14 of the glass 12. The channel guide 28 may be mounted in various ways to the inner body panel 31. In the present instance, by way of example, this is accomplished through the medium of upper and lower vertically spaced angle brackets 29. Each bracket 29 is shown as having a flange 29a at its outer end spot welded to the central vertical web of the channel 28 and a flange 29b at it inner end secured by a screw 30 to the body panel 31. The upper and lower brackets 29 thus position the channel guide 28 a suitable distance from the supporting panel 31 and within this space extends the swinging regulator arm 23. The arm 23 may swing, between its upper and lower positions, between the upper and lower brackets 29 and also between the channel guide 28 and the body panel 31.

The plate 19, which is preferably detachably secured to the glass retainer channel 15, has in the present instance a forward extension 19a in the form of a bracket. The bracket extension 19a may, as herein shown, be an integral part of the metal stamping forming the plate 19 or it may be a separate piece fastened to this plate. The extension 19a is provided with a central reinforcing embossment 19b and has upper and lower diverging arms or extensions 19c carrying a pair of vertically spaced guide studs 32. As seen in Figs. 2 and 5, each guide stud 32 may be similar in construction to the stud 22 on the outer end of the window regulator arm 23. The channel guide 28 has a vertical channelway 28a, the side edges of which are rolled or otherwise formed to provide V-shaped track or guide portions which embrace and are engaged by the head of each stud 32. The shank of the stud is riveted at 32a to the extension 19c of the member 19a. Slidingly mounted upon the stud 32 is a cup-shaped washer or compression member 33 engaged by a compression spring 34 which is interposed between the washer and the portion 19c. The tapered face of the washer 33 engages the correspondingly tapered edges of the opening 28a and it will be seen that the stud 32 will be permitted a slight in and out movement against the action of the spring-pressed compression member 33.

From the foregoing it will be seen that the channel guide 28 lies substantially or approximately in the vertical plane of the glass 12 and is arranged in such manner, as shown in Figs. 1 and 2, so that the upright edge 14 of the glass 12 may travel up and down within the window well on a line longitudinally spaced from the channel guide 28. At the same time this edge of the glass will be guided through the cooperation of the studs 32 with the channel guide 28 substantially in the plane of the glass. As also illustrated in Fig. 2 the lower end of the leg or extension 14b terminates at 19d immediately above the embossment 19b.

The rear upright edge 12a of the glass panel 12 may be guided within the window opening through the medium of the usual felt or otherwise lined channel 50 which is designed to embrace the edge of the glass when the glass is fully raised. This channel 50 terminates at or slightly below the lower edge of the window opening as indicated at 50a. Within the well below the window opening the window panel 12 is guided in its up and down path of movement substantially entirely through guiding means which is operative independently of the edge 12a. For this purpose, as shown in Figs. 1 and 3, there is mounted within the window well an upright or vertically extending fixed channel guide 39 which is offset to one side of the plane of the glass. The glass retainer channel 15 is provided at an end thereof, the rear end in the present instance, with an angle bracket 35, the outwardly directed horizontal flange 35a of which is secured, as by spot welding, to the bottom of the channel 15. At the inner side of the glass retainer channel 15 the angle bracket 35 has a depending extension, offset rearwardly at its lower end from the rear end of the channel 15, and carrying a transversely extending guide stud 36. The stud 36 is similar to the stud 32 and is riveted at 36a to the bracket 35. The shank of this stud has a cup-shaped washer or compression member 37 slidingly mounted thereon and engaged by a compression spring 38. The channel guide 39 has a vertical channelway 41, the edges of which are rolled to provide V-shaped track or guide portions embracing and engaged by the stud 36. The outer tapered faces of the edges of the channelway 41 are engaged by the correspondingly shaped tapered face of the washer or compression member 37, see Fig. 3. The channel guide 39 may be secured in any suitable manner directly to the inner body panel 31, such as by means of screws 40.

In the embodiment illustrated in Figs. 6 and 7 the guide device 36—38, its supporting bracket 35 and the channel guide 39 are replaced by a guide structure in which the guide device carried by the glass retainer channel 15 extends in a longitudinal instead of a transverse direction.

The rear end of the glass retainer channel 15 carries an angle bracket 42, the horizontal flange 42a of which is secured, as by spot welding, to the bottom of the channel 15. To the vertical flange of this bracket is riveted at 43a the reduced end of a cylindrical stud 43. Embracing the stud 43 is a cushion sleeve 44 which is preferably of resilient rubber or other relatively compressible non-metallic material, this sleeve bearing against an annular shoulder formed by a head 45 at the outer end of the stud 43. Surrounding the sleeve 44 and slidable thereon is the cylindrical sleeve of a compression member 46. This compression member 46 may be a die casting and is provided with a convex or flared annular washer portion 47 providing an annular cup-shaped recess at its back face for receiving and retaining one end of a compression spring 48, the opposite end of the spring bearing against the bracket 42. The cylindrical sleeve of the compression member 46 terminates in an annular inturned flange 49 apertured to slide freely over the stud 43 and limited in its outward movement by engagement with the end of the sleeve 44. Thus, the compression member 46 may slide longitudinally on the stud 43 upon the cushioning sleeve 44 thereof and against the effort of the spring 48 which at all times is under compression. The guide device comprising parts 43—49 cooperates with a vertical channel guide 51 which may be secured to the inner flange of the pillar 11 or, if desired, to the inner body panel 31 through the medium of upper and lower angle brackets 52. The guide 51 is in the form of a channel having a base and parallel side walls terminating in inwardly converging portions providing a constricted neck portion 51a, the metal thence being bent outwardly to provide diverging flared track or guide portions 51b. When the window is installed the guide preferably has a sliding fit in two directions against the constricted neck portion 51a. The crowned face of the washer portion 47 contacts the flaring or diverging portions 51b and at this time the spring 48 is under compression, thereby spacing the flange 49 from the shoulder formed by the inner end of the compression sleeve 44. This clearance space is normally sufficient so as to permit slight longitudinal movement of the compression member 46 on the sleeve 44 during operation of the window to compensate for slight variations. When the window panel 12 is lowered into the well the edge 12a thereof is permitted to pass through the channel guide 51 between the opposed portions 51a thereof. It will be understood, however, that the channel guide 51 may be positioned at a greater distance from the edge of the window glass in such manner that the edge thereof will not pass through the channelway of the guide. It will be seen that slight transverse movement of the compression member 46 upon the stud 43 will be permitted owing to the compressible nature of the sleeve 44.

From the foregoing it will be seen that the improved construction permits relatively easy and quick installation of the window glass in the door or other portion of the body upon the assembly line, a very desirable advantage where production is conducted on a large scale. For example, the window regulator, channel guides 28 and 39 or 51 and member 19 together with its guide studs 32 and associated parts may all be installed in the window well of the door or body before assembly of the window panels 12 and 13. The window panel 12 as a separate assembly unit may comprise the glass retainer channel 15 and angle bracket 35 or 42 with its projecting guide device, with or without the bar 14 secured to the forward edge of the panel 12, and this unit may be readily installed in the window opening on the assembly line by inserting the glass through the slot in the lower edge of the window opening between the outer and inner body panels 60 and 31. The glass retainer channel 15 may then be connected to the member 19 through the medium of the screws 20, thereby completing the assembly of the parts.

I claim:

1. In a window structure of the type having a window opening, a window well therebelow formed between inner and outer body panels, and a transparent panel slidable up and down in said window opening and well; an upright guide member adapted to be mounted in said well and lying substantially in the plane of the panel but beyond one upright edge thereof, a bracket secured to the lower edge of said panel and overlapping a longitudinal face of the guide member and having a plurality of transversely extending devices spaced in a vertical direction and slidingly cooperable with the guide member, said guide member being free of engagement with said panel.

2. In a window structure of the type having a window opening, a window well therebelow formed between inner and outer body panels, and a transparent panel slidable up and down in said window opening and well; an upright guide member adapted to be mounted in said well and lying substantially in the plane of the panel but beyond one upright edge thereof, a bracket secured to the lower edge of said panel and overlapping a longitudinal face of the guide member and having a plurality of transversely extending devices spaced in a vertical direction and slidingly cooperable with the guide member, said guide member being free of engagement with said panel and being longitudinally spaced from the adjacent edge of the panel when the latter is lowered within the well.

3. In a window structure of the type having a window opening, a window well therebelow formed between inner and outer body panels, two transparent panels closing said window opening, one transparent panel slidable up and down in said window opening and well; an upright guide member adapted to be mounted in said well and lying substantially in the plane of the slidable panel but beyond one upright edge thereof and beneath the other transparent panel, a channel member adapted to be secured to the lower edge of the panel, a bracket connected to said member, said bracket extending longitudinally and having a transversely projecting guide device or devices extending into the plane of the panel and adapted to cooperate with said guide.

4. In a window structure of the type having a window opening, a window well therebelow formed between inner and outer body panels, and a transparent panel slidable up and down in said window opening and well; a bracket adapted to be secured to the lower edge of the panel and extending longitudinally beyond an upright edge of said panel, said bracket having a transversely extending guide device or devices extending into the plane of the panel, a fixed upright guide in said well cooperable with said device or devices, means for mounting said guide on said inner body panel, and a window regulator arm adapted to be connected to the lower edge of said panel and swingable in a vertical direction between said guide and inner panel.

5. In a window structure of the type having a window opening, a window well therebelow formed between inner and outer body panels, and a transparent panel slidable up and down in said window opening and well; an upright guide member adapted to be mounted in said well and lying substantially in the plane of the panel but beyond one upright edge thereof, a member adapted to be secured to the lower edge of the panel, a bracket detachably connected to said member, said bracket extending longitudinally and having a transversely projecting guide device or devices extending into the plane of the panel and adapted to cooperate with said guide, means for mounting said guide on said inner body panel, and a window regulator arm adapted to be connected to the lower edge of said panel and swingable in a vertical direction between said guide and inner panel.

6. In a window structure of the type having a window opening, a window well therebelow formed between inner and outer body panels, a transparent panel slidable up and down in said window opening and well, and a window regulator having a swinging arm adapted to be connected to the lower edge of said panel; an upright guide channel mounted in said well adjacent but spaced from said inner body panel, a bracket adapted to be secured to the lower edge of the transparent panel and extending longitudinally beyond an upright edge of the panel, said guide channel being located substantially in the plane of said panel and said bracket having a guide device extending transversely to said panel and slidingly cooperable with said channel, said regulator arm extending between said channel and inner body panel, and means for mounting said channel on said inner body panel to permit swinging movement of the regulator arm in a vertical direction therebetween.

7. In a window structure having a window frame forming a closed figure at the upper portion thereof defining a window opening with a window well therebelow formed between inner and outer body panels, two transparent panels closing said window opening, one transparent panel slidable up and down in said window opening and well; guide means for said slidable transparent panel comprising an upright guide member adapted to be mounted in said well and lying substantially in the plane of the slidable panel but beyond one upright edge thereof and beneath the other transparent panel, a transversely extending guide device including a spring pressed compression member cooperable with said guide member and movable therealong to guide the transparent panel, and means for supporting said device upon the lower edge of the transparent panel.

8. Guide means in a window structure according to claim 7 in which said supporting means comprises a bracket extending longitudinally to overlap a face of said guide member.

9. In a window structure having a window frame forming a closed figure at the upper portion thereof defining a window opening with a window well therebelow formed between inner and outer body panels, and a transparent panel slidable up and down in said window opening and well; an upright guide adapted to be mounted in the well and comprising a channel facing transversely and having spaced parallel edges, a spring pressed compression device engageable with and adapted to travel along said edges, means for mounting said channel beyond one upright edge of the transparent panel, and means for mounting said device upon the lower edge of said transparent panel.

10. Guide means in a window structure according to claim 9 comprising a swinging window regulator arm connected to the lower edge of the transparent panel and swingable between said guide and inner body panel.

11. In a window structure of the type having a window opening, a window well therebelow formed between inner and outer body panels, and a transparent panel slidable up and down in said window opening and well; an upright guide member adapted to be mounted in said well inwardly and independently of said outer panel, a retainer channel structure adapted to be secured to the lower edge of the panel and having a longitudinal guideway, a guide device carried by said structure and cooperable with said guide member when the window panel is raised and lowered, and a swinging window regulator arm having a device movably cooperable with said guideway and having a portion thereof movable in a vertical direction between said guide and inner body panel.

12. In a window structure of the type having a window opening, a window well therebelow formed between inner and outer body panels, and a transparent panel slidable up and down in said window opening and well; a bracket adapted to be secured to the lower edge of the panel, said bracket having a transversely extending guide device or devices, a fixed upright guide in said well cooperable with said device or devices, means for mounting said guide on said inner body panel, and a window regulator arm adapted to be connected to the lower edge of said panel and having a portion swingable in a vertical direction between said guide and inner panel.

13. In a window structure of the type having a window opening, a window well therebelow formed between inner and outer body panels, a transparent panel slidable up and down in said window opening and well, and a window regulator having a swinging arm adapted to be connected to the lower edge of said panel; an upright guide channel mounted in said well adjacent but spaced from said inner body panel, a bracket adapted to be secured to the lower edge of the transparent panel, said bracket having a guide device extending transversely to said panel and movably cooperable with said channel, said regulator arm extending between said channel and inner body panel, and means for mounting said channel on said inner body panel to permit swinging movement of the regulator arm in a vertical direction therebetween.

14. In a window structure having a window frame forming a closed figure at the upper portion thereof defining a window opening with a window well therebelow formed between inner and outer body panels, and a transparent panel slidable up and down in said window opening and well; an upright guide member adapted to be mounted in said well inwardly and independently of said outer panel, a retainer channel adapted to be secured to the lower edge of the panel, a depending bracket carried by said channel, a guide device carried by said bracket and adapted to travel in an up and down direction on said guide member, a swinging regulator arm having a connection at its outer end to the bracket and having a portion thereof movable in a vertical direction between said guide member and said inner body panel.

JOHN H. ROETHEL.